(No Model.)

R. PARISH.
NIPPLE FOR PIPE CONNECTIONS.

No. 392,221. Patented Nov. 6, 1888.

WITNESSES:
Hermann Bormann
Thomas M. Smith

INVENTOR:
Richard Parish,
By J. Walter Douglass.
ATT'Y.

United States Patent Office.

RICHARD PARISH, OF PHILADELPHIA, PENNSYLVANIA.

NIPPLE FOR PIPE-CONNECTIONS.

SPECIFICATION forming part of Letters Patent No. 392,221, dated November 6, 1888.

Application filed May 2, 1888. Serial No. 272,570. (No model.)

*To all whom it may concern:*

Be it known that I, RICHARD PARISH, a citizen of the United States, residing at Philadelphia, in the county of Philadelphia and State of Pennsylvania, have invented a certain new and Improved Nipple for Pipe-Connections, of which the following is a specification.

My invention has relation to simple means for making tight threaded detachable union-joints of pipes or other connections.

The principal object of my invention is to provide a nipple having threaded extremities that taper from one end in the same direction to the opposite end, and with one end enlarged or expanded, so that the diameter of the nipple at said extremity is greater than that of a pipe corresponding with the opposite end of the nipple, whereby in use, in connection with a combined enlarged and reducing body or fitting having the interior threaded with a chamber between the threaded portions that taper in the same direction as that of the threaded portion of the nipple, it may be readily inserted through the enlarged part or portion of the body or fitting and screwed to place in the reduced part or portion thereof, and the nipple then connected at the opposite extremity to a suitable fitting, thereby making a very tight as well as a readily-detachable union-joint of pipes or other connections. This improved nipple may be used to connect pipes of the same or different sizes, as may be desired, and thereby entirely dispense with long screws, ground joints, and right and left joints, all of which have been more or less objectionable for many reasons, but principally because such were subject to leakage due to the destruction of the packing, and in steam-fitting in the use of soft-metal seats to the melting or burning out of the joints.

My improved nipple is especially applicable for connecting pipes over fires where packed joints or soft-metal seats cannot be used or where right-and-left nipples cannot be utilized. Furthermore, this nipple can be used to connect reducing connections or fittings direct with pipes without bushings and where right-and-left pieces with springs between the connections cannot be availed of, because the joints formed by the use of my improved nipple are always either right or left threaded joints.

The nature and characteristic features of my invention will be fully understood when taken in connection with the accompanying drawings, in which—

Figure 1:
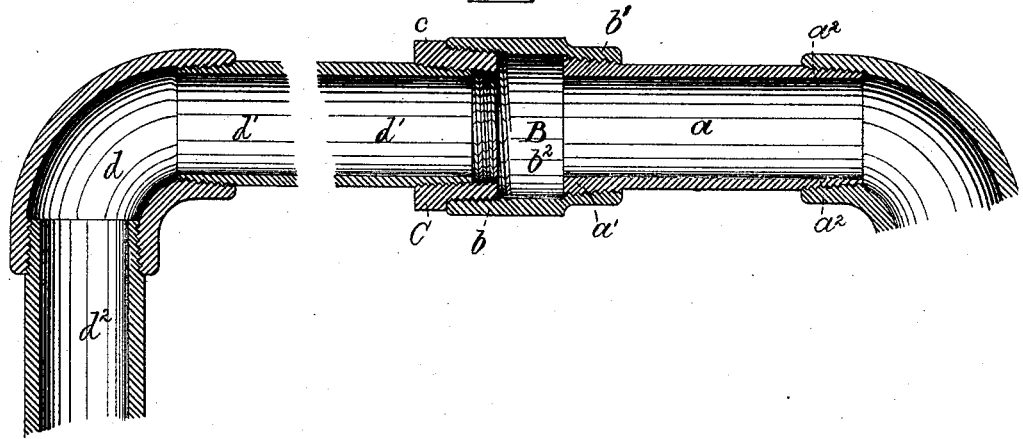
Figure 2:
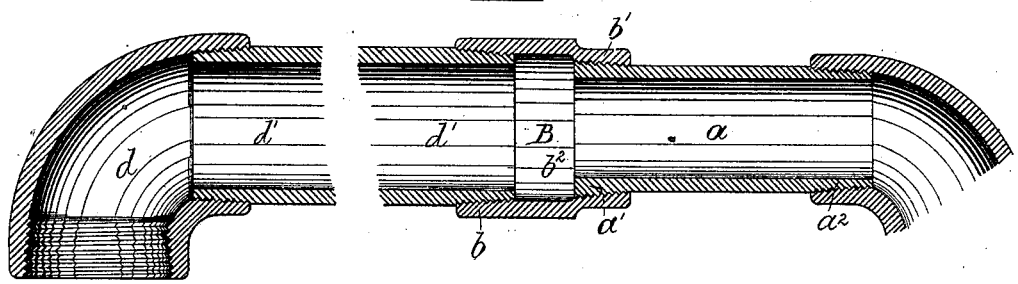

Figure 1 is a sectional view of an ordinary oppositely-tapering threaded nipple or pipe screwed to an elbow and to a bushing connected with a fitting or body, and illustrating also my improved nipple having the threads tapering in the same direction from one end to the opposite end, and with one of the ends enlarged or expanded, and showing the application of my improved nipple for uniting or connecting pipes of similar sizes; and Fig. 2 is a similar view of my improved nipple and body or fitting, showing also the manner of connecting pipes of different sizes direct without the use of interposed bushings or other detachable connections.

Referring to the drawings, $a$ is the improved nipple, made of brass, iron, or other suitable metal, having both ends threaded when used for connecting steam, gas, or other metal pipes, and with the threaded portions tapering from one end in the same direction to the opposite extremity. One of the ends, $a'$, for instance, Fig. 1, is enlarged or expanded, so that the diameter of the nipple from the point of formation of the threads thereon to the end of the nipple will be greater than the diameter of the nipple at the opposite extremity. By constructing the nipple in this manner it may be readily inserted through a combined enlarged and reducing fitting or body and screwed to place in the reducing portion of the body or fitting with the opposite end of the nipple at the same time secured into a suitable fitting or connection. By simply reversing the movement of the nipple it may be quickly detached again for repairs or for whatever purpose may be desired, and in detaching the nipple it will be caused to occupy a position in a chamber between the enlarged and reduced threaded portions of the body or fitting. This body or fitting B may be constructed of any desired shape or form with an enlarged portion, $b$, and with a reducing portion, $b'$, and between which is formed a chamber, $b^2$. The enlarged interior threaded portion, $b$, of the body B tapers in a similar direction to that of the nipple $a$. The opposite or reducing threaded portion, $b'$, of the body tapers in a corresponding direction. Into the reduced portion of the body or fitting the expanded end $a'$ of the nipple is secured to place, and the opposite extremity, $a^2$, of the nipple tapers in a direction corresponding to that of the enlarged or expanded portion $a'$, and may be readily fitted to an elbow or other desired fitting.

C is a bushing formed with a hexagonal or other form of rim, $c$, to permit of the securing of the same to place in the enlarged portion $b$ of the fitting or body B, and to this bushing C and an elbow, $d$, is secured a length of pipe, $d'$, threaded in opposite directions, and to the opposite extremity of the elbow $d$ is secured another length of pipe, $d^2$.

In order to detach the several parts connected with the bushing C and elbow $d$, it becomes necessary to take each apart, thereby requiring time and labor, while on the other hand with the use of my improved nipple it may be readily accomplished by simply reversing the movement of the nipple, thereby causing the same to occupy a position at the extreme end of the enlarged chamber $b^2$ of the body B; or in lieu thereof the body may be readily detached from the reducing-bushing C. While the nipple (upon its release from the oppositely-located fitting) will occupy a position within the chamber $b^2$ of the body or fitting B, it will nevertheless have free play therein, which will permit of the release of the body B from the bushing connecting the other parts as readily as the release of the nipple $a$.

It will be observed by reference to Fig. 1 that pipes of similar sizes may be readily connected by means of said nipple and the body or fitting B and as readily disconnected for whatever purpose it may become necessary so to do.

In Fig. 2 is illustrated the nipple $a$ in application for connecting direct, by means of the improved fitting or body B, pipes of different sizes and dispensing with a reducing-bushing fitted into the fitting or body.

I am aware that nipples for making union-joints of pipes have been used in various ways, and hence I do not claim, broadly, as of my invention a nipple; but What I do claim as new, and desire to secure by Letters Patent, is—

1. In pipe-connections, the combination of a socket or fitting, a nipple having threaded ends which taper in one and the same direction and with one of said ends expanded, and a body or fitting having the threaded portion thereof tapering in a direction corresponding with the ends of said nipple, all arranged as shown and described, and for the purposes set forth.

2. In pipe-connections, the combination of a socket or fitting, a nipple having the ends tapering in one and the same direction and with one of the ends expanded, and a body or fitting with the threaded portions tapering in a direction corresponding with the ends of said nipple and one part of said body or fitting enlarged, whereby a detachable union-joint may be made with pipes or fittings, substantially as described.

3. In pipe-connections, the combination of a fitting, a nipple having the ends tapering in one and the same direction and with one of the ends expanded, a body or fitting with the threads thereof tapering in a direction corresponding with those of said nipple and one part of said fitting or body enlarged, and a bushing secured into the enlarged portion of said body or fitting, whereby a detachable union-joint may be made with pipes of the same size, substantially as described.

In witness whereof I have hereunto set my signature in the presence of two subscribing witnesses.

RICHARD PARISH.

Witnesses:
 HERMANN BORMANN,
 THOMAS M. SMITH.